US006886006B1

(12) United States Patent
Castle

(10) Patent No.: US 6,886,006 B1
(45) Date of Patent: Apr. 26, 2005

(54) METHOD AND APPARATUS FOR DISCLOSING PROFILE INFORMATION TO A READER

(75) Inventor: Daniel C. Castle, Monmouth, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 529 days.

(21) Appl. No.: 09/718,290

(22) Filed: Nov. 21, 2000

(51) Int. Cl.[7] .............................................. G06F 17/30
(52) U.S. Cl. ............................ 707/3; 707/10; 707/102
(58) Field of Search .............................. 707/3, 10, 102, 707/104.1; 715/517

(56) References Cited

U.S. PATENT DOCUMENTS

| | | | |
|---|---|---|---|
| 5,530,852 A | | 6/1996 | Meske, Jr. et al. .......... 709/206 |
| 5,754,939 A | * | 5/1998 | Herz et al. ................. 455/3.04 |
| 5,761,662 A | | 6/1998 | Dasan .......................... 707/10 |
| 5,873,076 A | * | 2/1999 | Barr et al. ...................... 707/3 |
| 6,119,098 A | * | 9/2000 | Guyot et al. .................. 705/14 |
| 6,141,010 A | * | 10/2000 | Hoyle .......................... 345/854 |
| 6,374,237 B1 | * | 4/2002 | Reese ............................ 707/3 |
| 6,480,835 B1 | * | 11/2002 | Light ............................. 707/3 |
| 6,487,538 B1 | * | 11/2002 | Gupta et al. .................. 705/14 |
| 6,557,006 B1 | * | 4/2003 | Headerick et al. ....... 707/104.1 |
| 2002/0026349 A1 | * | 2/2002 | Reilly et al. | |
| 2003/0020744 A1 | * | 1/2003 | Ellis et al. | |
| 2004/0250272 A1 | * | 12/2004 | Durden et al. ................ 725/25 |

OTHER PUBLICATIONS

Pretschner, A.; Guach, S.; "Ontology based personalized serach", Tools with Artificail Intelligence, 1999. Proceedings. 11th IEEE International Conference on, 1999, pp. 391–398.*

Young–Woo Park; Eun–Seok Lee; "A New Generation Method of a User Profile fpr Information Filtering on the INternet", Information Networking, 1998. (ICOIN–12) Proceedigs., Twelth International Conference on, Jan. 21–23, 1998, pp. 261–264.*

Yi–Hung Wu ; Chen, A.L.P.; "Index Structures of Usere Profiles for Efficient Web Page Filtering Services", Distributed Computin Systems, 2000. Proceedings. 20th International Conference on, 2000, pp. 644–651.*

* cited by examiner

*Primary Examiner*—Luke S Wassum
*Assistant Examiner*—Susan Rayyan

(57) ABSTRACT

A document delivery system that provides first content and second content to a reader over a network, such as the Internet. The delivery system selects content for the reader based upon profile information. The profile information may relate to any one or more of the first content, the second content, and the reader. In addition to providing the first and second content to the reader, the delivery system also provides at least the profile information used to select the first content and second content for delivery to the reader.

28 Claims, 6 Drawing Sheets

PROFILE INFORMATION FOR SUBSCRIBER NO. 57660

ADDRESS:         123 MAIN STREET
CITY:            NOWHERE
STATE:           OREGON
POSTAL CODE:     97210
COUNTRY:         UNITED STATES

AGE CLASS:       G (35-40)

SEX:             MALE

INCOME LEVEL:    D ($65,000-$75,000)

MARITAL STATUS:  SINGLE

PROFESSION:      ELECTRICAL ENGINEER

HOBBIES/INTERESTS:
    ASTRONOMY
    RED + WINE
    - (WHITE + WINE)
    AUTOMOBILE + RACING + NASCAR
    COOKING
    WHITEWATER + KAYAKING
    - ((SEA OR OCEAN) + KAYAKING)

Fig. 5

METHOD AND APPARATUS FOR DISCLOSING PROFILE INFORMATION TO A READER

FIELD OF THE INVENTION

The invention relates to a method and apparatus for use with a system that provides content to a reader based upon profile information, such as the reader's geographic location, hobbies, and the like. More particularly, the invention is a method and apparatus for disclosing to a reader the profile information that caused the reader to receive particular content from the system. Moreover, various embodiments of the invention may further allow the reader to modify his or her profile information.

BACKGROUND OF THE INVENTION

Since the mid 1400's, with the advent of the movable type press, written publications have been used to disseminate information. As publishing has evolved, publishers have tried to target the specific interests of readers by publishing books and periodicals that only have informational content related to a particular subject. For example, there are magazines that are directed exclusively to automobiles, interior decorating, science, antiques, and a tremendous variety of other subjects.

Advertisers have taken advantage of such topic-specific publishing. In fact, for publications on a particular subject having only limited distribution, advertising may pay for much or all of the publication costs. This arrangement allows readers to obtain informational content directed to their specific interests, while at the same time allowing advertisers to concentrate their advertising expenses for advertisements that are reasonably certain to reach the advertisers target audience.

This arrangement is an improvement over mass publishing, but it still has a number of drawbacks. First, a reader will typically have several unrelated interests. For example, a reader may be interested in automobiles, stamp collecting, gardening and boating. In order to obtain information on each of these topics, a reader thus will typically have to subscribe to several different publications. Second, even the most specifically targeted periodical must still be generated for as broad an audience as possible. Thus, while a reader may subscribe to an automobile magazine only to read articles related to particular make and model of automobile, such articles may only occasionally be printed in the magazine. If the reader does not read the magazine other than for those specific articles, then the reader will not review the advertisements accompanying the unread articles, thereby reducing the effectiveness of the magazine to the advertisers. Third, a reader may not be able to subscribe to or read every periodical relating to a specific subject, and therefore may miss an article that would be of special interest.

Recently, publishers have begun to deliver informational content electronically over information networks, such as the Internet. One such system is described in U.S. patent application Ser. No. 09/325,040 to Jon A. Brewster et al, filed on Jun. 7, 1999. These types of content delivery systems allow publishers to provide very specific informational content to an individual based upon collected profile information for that individual. For example, if a reader has indicated an interest in a particular make and model of automobile, the delivery system can provide the reader with informational content (e.g., magazine articles) related to only that make and model of automobile, while filtering out other, unrelated, informational content. Similarly, along with the informational content for specific subject matter, the system can provide advertising or commercial content to a reader based upon the reader's profile information or the advertiser's profile information. For example, a ski equipment company can designate that its advertisements appear with informational content relating to skiing, or be provided to readers that have indicated an interest in the subject of skiing.

While these Internet delivery systems can provide both specifically targeted informational and advertising content to readers, these systems do not inform the readers as to why they are receiving the content. This can be very intimidating to a reader. In some instances, the system may provide content that is so specific to the reader's current situation that the reader may become concerned that his or her privacy is being violated. For example, if the reader is having financial trouble and receives advertising content for a credit consolidation service, the reader may believe that the system has improperly obtained the reader's personal finance information. In actuality, the advertisement may only have been provided to the reader because the advertiser designated that the advertisement be included with all distributed articles relating to personal finance. As the amount of personal information collected over the Internet has increased, the concern over privacy issues has increases as well, and will probably continue to do so in the foreseeable future.

Still further, the profile information for a reader may be incorrect or inaccurate, causing the reader to receive undesired content. For example, while a reader owns a particular make and model of automobile, the reader's profile information may correctly indicate that the reader desires to receive articles relating to that make and model of automobile. If the reader sells that automobile, however, the reader will probably stop wanting articles relating to that make and model of automobile. If the reader's profile information is not updated, then the reader may continue to receive unwanted articles about that automobile.

Moreover, the profile information may not be sufficiently specific. For example, if a reader orders an article on postage stamps featuring Elvis Presley, the reader's profile information may be automatically revised to indicate an interest in postage stamps, causing the reader to receive articles on stamp collecting. In fact, the reader may be primarily interested in Elvis Presley, and thus interested in only receiving articles on postage stamps that feature Elvis Presley.

SUMMARY OF THE INVENTION

The method and system of the invention provide various embodiments that may advantageously address these drawbacks to conventional Internet content delivery systems. More particularly, the system employs a knowledge module to contain profile information, and an edit module to contain informational or subject matter content (sometimes referred to hereafter as "first" content), such as an article, and advertising or commercial content (sometimes referred to hereafter as "second" content), such as an advertisement. The system also employs a transmission module for transmitting the first content and the second content to a reader based upon the profile information contained in the knowledge module. The transmission module also transmits to the reader at least the profile information used to make the determination that the first content and the second content be transmitted to the reader.

The transmission module uses a template to deliver the content. The template may include a field for the first content and a separate field for the second content. Further, the template may have a message field for displaying messages to the reader that are produced by the delivery system, such as the reader's name, the date, pagination and the reader's location. This message field may additionally include the profile information. Alternately, the template may have an additional profile information field specifically for displaying the profile information. The template may also have an interface for modifying some or all of the profile information.

The profile information transmitted to the reader for display may include content profile information corresponding to the first content, advertisement profile information corresponding to the second content, and reader profile information corresponding to the reader. If the profile information includes reader profile information, it may be behavior information based upon the reader's past behavior and/or voluntary information voluntarily provided by the reader. The reader profile information may be descriptive information describing the reader's personal characteristics, "desired" information indicating specific content desired by the reader, or "denied" information indicating specific content the reader does not want to receive.

BRIEF DESCRIPTION OF THE DRAWINGS

FIG. 5 illustrates a Web page displaying a reader's reader profile information.

DETAILED DESCRIPTION OF THE EMBODIMENTS

Figure 1:
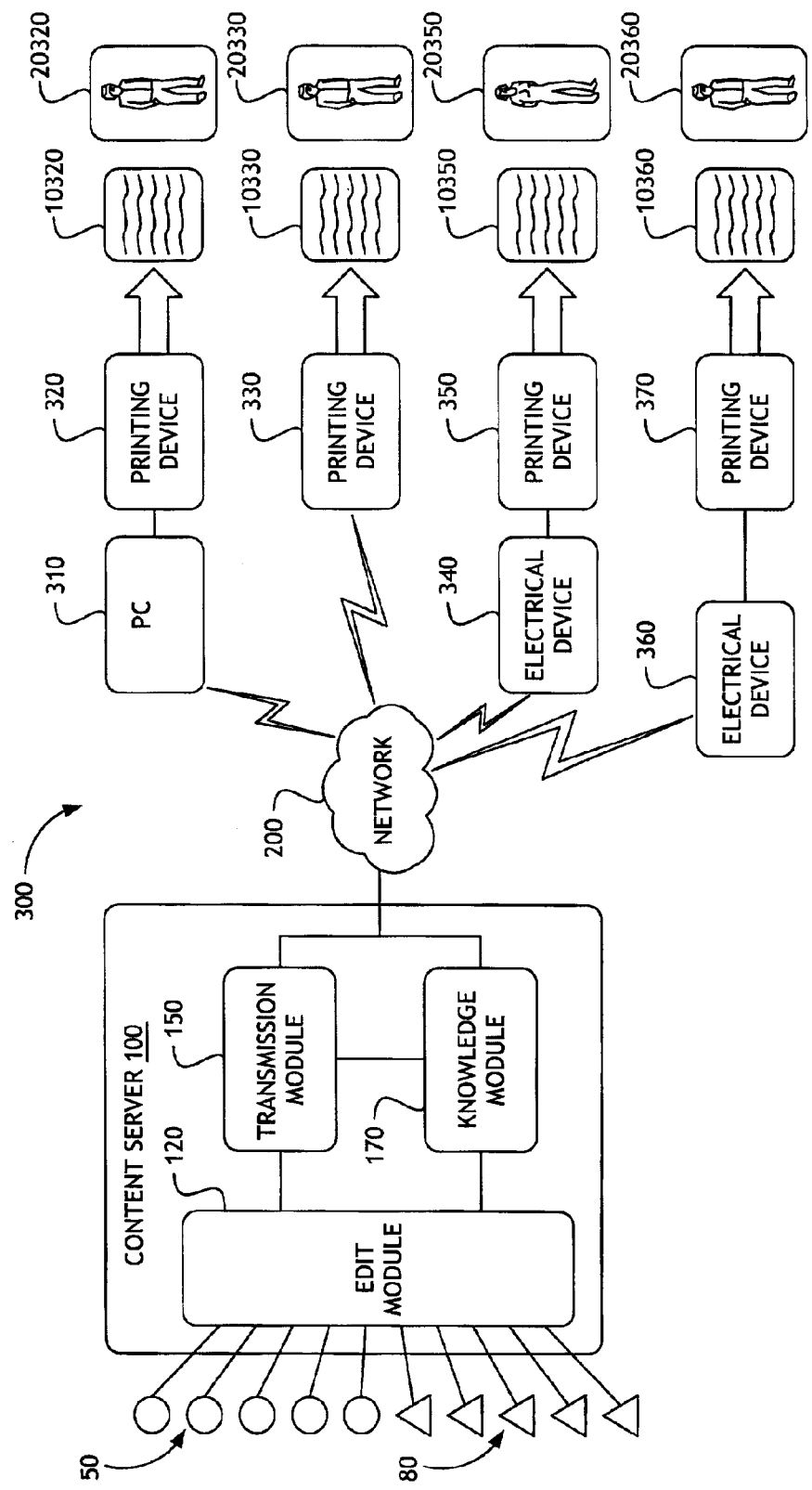
FIG. 1 is a block diagram of a content delivery system according to an embodiment of the invention.

FIG. 1 shows a block diagram of a content delivery system of one embodiment of the invention. Content delivery system 10 includes content server 100, which is operatively connected via a network 200 to a variety of personal computers, printing devices, and other electronic devices, collectively referred to as devices 300. Content server 100 includes the edit module 120, transmission module 150, and knowledge module 170. As will be explained in detail below, edit module 120 receives informational or subject matter content (i.e., first content) from one or more content providers 50, and/or advertising or promotional content (i.e., second content) from one or more advertising providers 80. In one preferred embodiment, the content server 100 is a minicomputer/server, such as a HP 9000 server, sold by the Hewlett-Packard Company. Those of ordinary skill in the art will appreciate, however, that content server 100 could alternately be any type of computing or electronic device or devices, including a network of personal computers or workstations, any of which can perform the functions described herein and still fall within the spirit and scope of the invention.

Network 200 is preferably the Internet, although an intranet, local area network or other type of public or private information network, whether wired (e.g., telephone, cable TV, etc.) wireless (e.g., satellite, radio, cell phone, etc.) or a combination of the two could also or additionally be used.

Devices 300 are shown in FIG. 1 as being configurable in a wide variety of ways. For example, personal computer 310 is shown connected to printing device 320, which prints document 10320 for reader 20320. Personal computer 310 is operatively coupled to network 200. In contrast, printing device 330, which prints document 10330 for reader 20330, is operatively coupled to network 200 without an intervening personal computer or other electronic deice. Printing device 350, which prints document 10350 for reader 20350, is shown connected to electronic device 3400, which could be a set top box, television set, handheld PDA or other type of electronic device that is operatively coupled to network 200. Finally, printing device 370, which prints document 10370 for reader 20370, is connected to electronic device 350, which is operatively connected to network 200.

The printing devices shown in FIG. 1 could be printers, such as the Hewlett-Packard DeskJet 890 printer, the Hewlett-Packard Laserjet V printer, or other models of printer manufactured by Hewlett-Packard or others. The printing devices could also be so called "mopiers" or other multi-function printing devices that can print, fax, scan, and/or copy, or any other device capable of transferring information to a printable media such as plain paper, specialty paper, transparencies, or other media capable of tangibly receiving such information. Still further, the printing devices may, for some embodiments of the invention, include any type of display device known in the art that can display content, such as computer monitors or television screens, and even Braille "display" devices.

Figure 2:
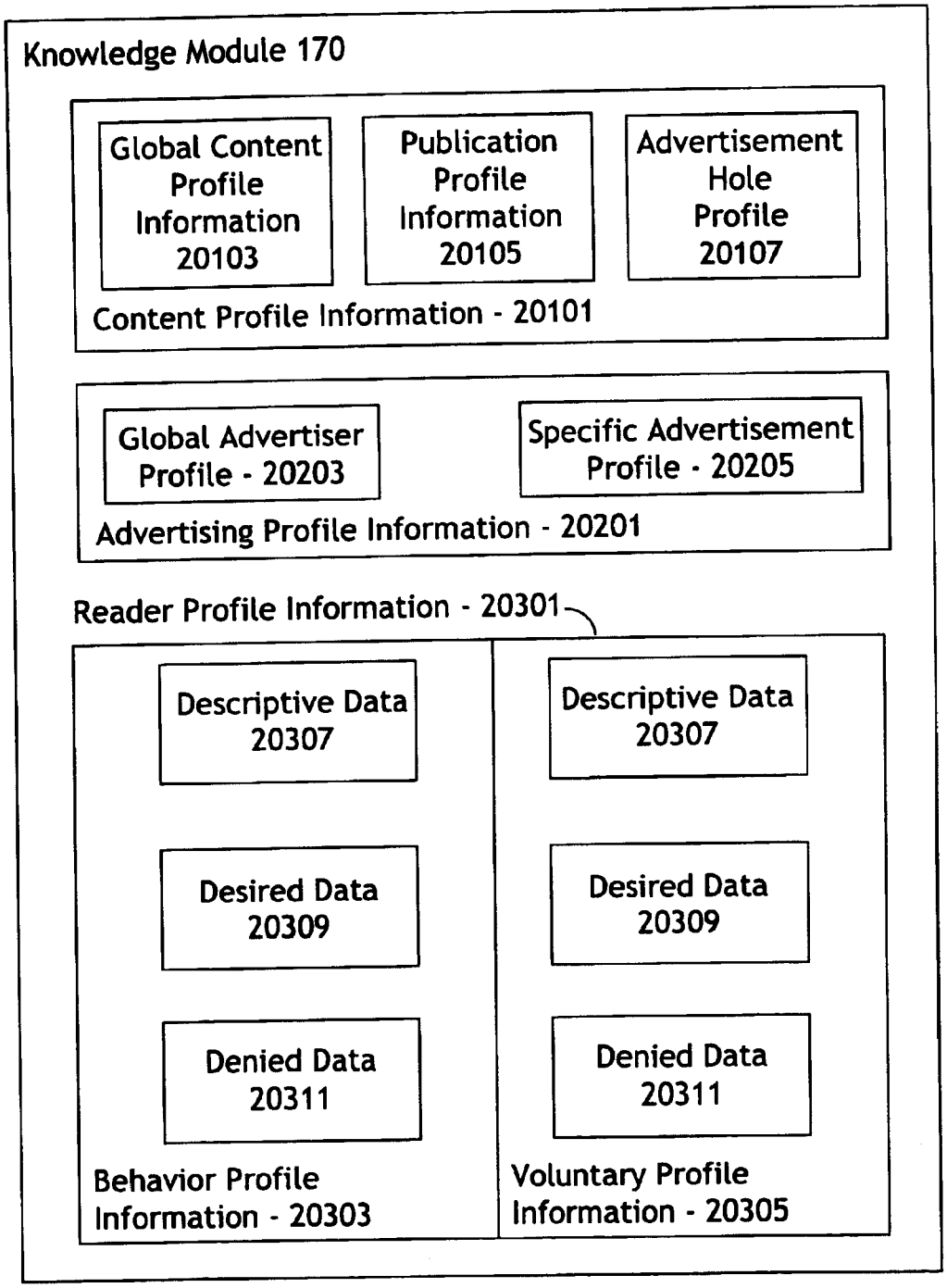
FIG. 2 illustrates the knowledge module according to an embodiment of the invention.

The knowledge module 170, shown in more detail in FIG. 2, is a database preferably stored in random access memory, or other computer storage media. As previously noted, it contains profile information that it is used to determine the particular content received by each reader or service subscriber. In some embodiments of the invention, the profile information is data stored as classifications and/or keywords. Classification data would be, for example, selections from a list of criteria, such as gender, ages of family members, level of household income, and ethnicity. Keyword data, on the other hand, would be freeform or Boolean search constructs using specific terms, such as "cars" or "Ford and cars." Keyword data might be entered in a facilitated fashion, as through dialogue, but may be stored as noted here.

Figure 3:
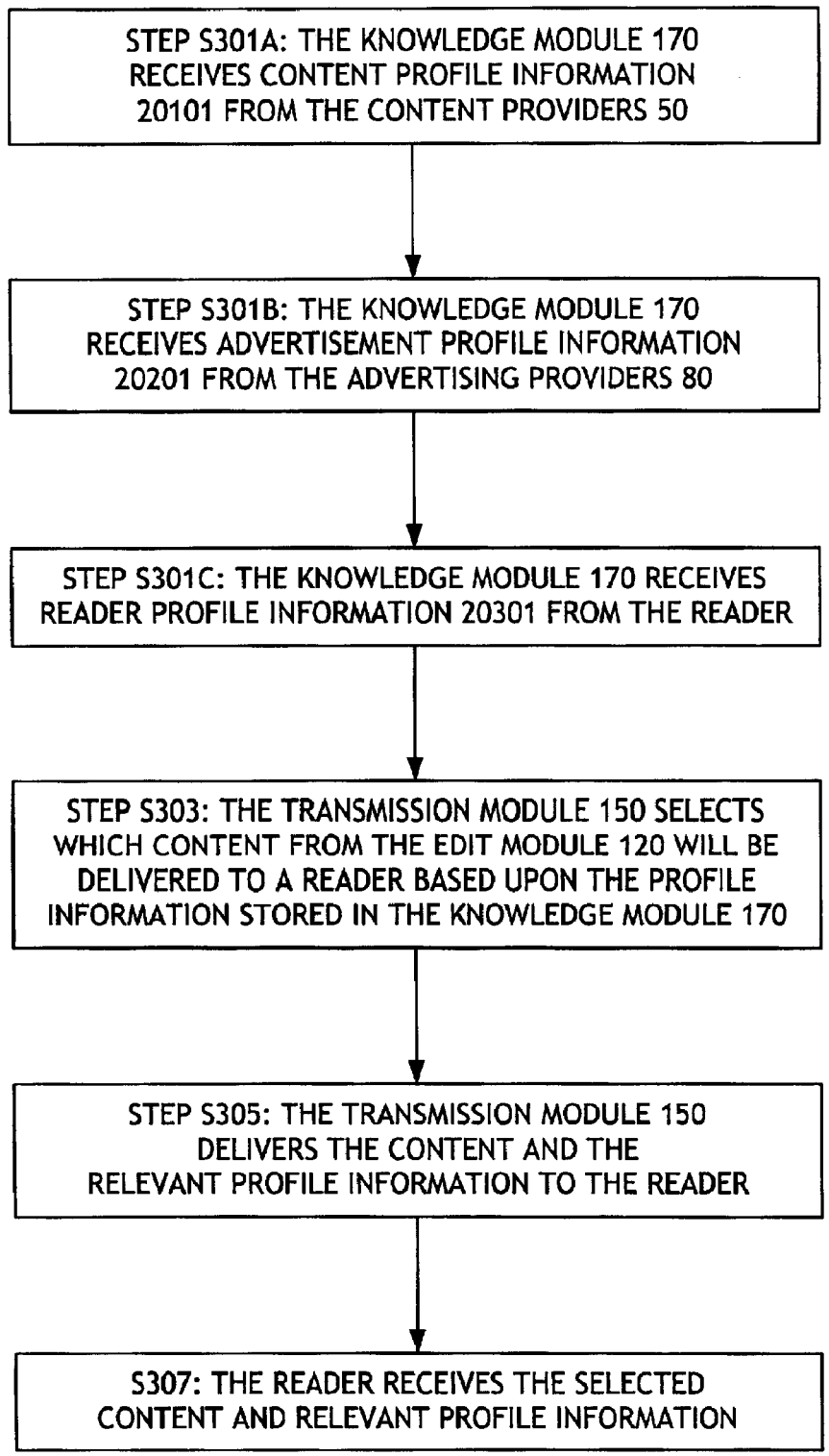
FIG. 3 is a flowchart describing the operation of an embodiment of the invention.

The operation of the illustrated embodiment of the invention will now be described with reference to FIG. 3. As shown in this figure, the knowledge module 170 receives content profile [CP] information 20101 from the content providers 50 in step S301A. The content profile information 20101 is profile information that is specific to the informational content (sometimes referred to hereafter as "first" content). In step S301B, the knowledge module 170 also receives advertisement profile information 20201 from the advertising providers 80. The advertisement profile information 20201 is related to the advertising or commercial content (sometimes referred to hereafter as "second" content). Further, in step S301C, the knowledge module 170 receives reader (or consumer) profile [RP] information 20301, either directly or indirectly, from the reader. The reader profile information 20301 relates to each reader's or service subscriber's preference for content to be provided to that reader. Those of ordinary skill in the art will appreciate that the steps S301A–S301C can occur in any order. Preferably, the knowledge module 170 is continuously receiving each of content profile information 20101, advertisement profile information 20201, and reader profile information 20301.

The content profile [CP] information 20101 is used to indicate the subject matter of particular pieces of informational content for routing that content to readers and to control the advertising associated with that informational content. To fulfill these functions, the content profile information 20101 may include global content profile [GCP] information 20103, publication profile [PP] information 20105 and/or advertisement hole profile [AHP] information 20107. For example, an informational content provider may have global content profile information 20103 with the logical keyword combination "–tarot" to preclude any of its informational content from being attached to an advertisement pertaining to tarot cards. An informational content provider may also have publication profile information 20105 that include the keywords "Houston" and "Astros" for a particular piece of informational content. These keywords in the publication profile information 20105 allow that piece of informational content to be attached to other content or advertisements specifically related to the Houston Astros. These keywords also facilitate delivery of that piece of informational content to those readers who have indicated a preference for informational content related to the Houston Astros. Still further, an informational content provider may have advertisement hole profile information 20107 for a particular advertising location related to a piece of informational content. For example, the informational content provider's advertisement hole profile information 20107 for a story on the beginning of the Little League season may include the logical keyword term "baseball and bat," to indicate that the informational content around the advertising hole for the article may be specifically helpful in the sales of baseball bats.

The advertising profile information 20201, which the transmission module 170 receives from the advertising providers 80, similarly allows advertising providers 80 to attach their advertising or commercial content to the optimum informational content, and to avoid informational content that may be detrimental to the advertising provider's purpose. The advertising profile information 20201 may include both global advertiser profile [GAP] information 20203 and specific advertisement profile [SAP] information 20205. Thus, global advertiser profile information 20203 for an athletic footwear manufacturer might contain the keyword "shoes," augmented by specific advertisement profile information 20205 for a particular advertisement containing the keyword "basketball." As a result, that particular advertisement would be eligible for delivery to users whose reader profile information 20301 did not preclude items about basketball or items about shoes.

The reader profile [RP] information 20301, which the transmission module 170 receives from a reader, allows a reader to directly or indirectly designate both content be or she would like to receive, and content he or she would like to avoid. The reader profile [RP] information 20301 may include both behavior profile information 20303 and voluntary profile information 20305. Behavior profile information 20303 is information gleaned from the reader's past behavior, such as the reader's previous choice of content from the document delivery system. For example, if a reader selects a publication with content profile information 20103 containing both the keywords "Houston" and "baseball," then these keywords may be automatically added to that reader's behavior profile information 20303. Thus, the behavior profile information 20303 allows both informational content and advertisements about baseball to reach this reader from publications that may not be about baseball, given that the reader has shown prior interest in baseball, and even if the reader has not taken the trouble to volunteer this information.

Voluntary profile information 20305 is obtained by either active or passive interaction with the reader. For example, a reader may be asked to enter a postal zip code when installing software downloaded through the content delivery system 101. The zip code, gleaned through active interaction from the company, is then added to the reader's voluntary profile information 20305. As will be explained further below, the content delivery system may also provide a Web interface that allows a reader to modify his or her reader profile information 20301. This interface may be considered a passive interaction, as the reader may be required to go to some effort to access the interface. Of course, those of ordinary skill in the art will appreciate that both behavior profile information 20303 and voluntary profile information 20305 can be obtained from a variety of sources in addition to or instead of the delivery system's own interaction with the reader, such as from other Internet services provided to the reader, surveys mailed to the reader, publicly or privately maintained records, etc.

As seen from FIG. 2, the reader profile information 20301 may include data of three general types. These are "descriptive" data 20307, "desired" data 20309, and "denied" data 20311. Descriptive data 20309 is data that describes characteristics of the reader. In the example discussed above, the reader's postal zip code is descriptive data 20307 in that it describes the reader's geographical location. The descriptive data 20307 may serve to identify informational content that may interest the reader, such as articles on the reader's neighborhood. It may also help identify advertising or commercial content that may be of interest to the reader, such as an advertisement for a sale at a local store. Desired data 20309 is similar to descriptive data 20307, but may be given a greater degree of preference, as this data 20309 indicates subject matter for which the reader has specifically indicated an interest (either voluntarily or by past behavior). For example, if the reader has a specific interest in Cairn Terrier dogs, then the logical combination of keywords "Cairn Terrier" might be included as desired data 20307 in the reader's voluntary profile information 20305, to indicate the reader's desire to receive content relating to Cairn Terrier dogs.

Denied data 20311 indicates subject matter for which the reader has indicated (either voluntarily or by past behavior) a desire not to receive content. That is, denied data 20311 indicates when the reader has specifically "opted out" of content that matches this profile information. For example, if a reader has an aversion to spiders, the reader's reader profile information 20301 could include denied data 20311 indicating a desire not to receive informational content relating to spiders. Similarly, if the reader has a dislike of tobacco companies, the reader's reader profile information 20301 could include denied data 20311 indicating a desire not to receive advertising content from individual tobacco companies, or from tobacco companies as a whole group. In some embodiments of the invention, denied data 20311 may be easily represented by a keyword or logical combination of keywords preceded by a minus sign (e.g., –spiders). Further, denied data 20311 may be given more weight than descriptive data 20307 and desired data 20309, as it indicates a strong desire not to receive particular types of content.

The transmission module 150 is an executable computer program that is designed and written to select, in step S303, which content from the edit module 120 will be delivered to a reader based upon the profile information stored in the knowledge module 170. For example, with some embodiments of the invention, the transmission module 150 may select informational content for delivery to a reader based upon a comparison of the reader's reader profile information 20301 with the content's content profile information 20101. Once informational content has been selected for a reader, the transmission module 150 may then select one or more advertisements to accompany the informational content by favorably matching each advertisement's advertising profile information 20201 with the informational content's content profile information 20101 and the reader's reader profile information 20301.

Alternate embodiments of the invention may instead first match informational content to one or more advertisements by comparing the informational content's content profile information 20101 with each advertisement's advertising profile information 20201. After the informational content has been matched with one or more advertisements, the transmission module 150 may then determine which readers should receive the informational content and advertisement(s) by comparing the content profile information 20101 and the advertising profile information 20201 with each reader's reader profile information 20301. Of course, those of ordinary skill in the art will appreciate that a wide variety of other techniques for matching informational content, advertising and readers using profile information are known in the art and can be employed. Further, it will be appreciated that the transmission module 150 may use the profile information to select only informational content for delivery to the reader, or may alternately use the profile information to select only advertising or commercial content for delivery to the reader.

In any case, after the transmission module 150 has selected content from the edit module 120 for delivery to a reader in step S303, the transmission module 150 delivers the content for delivery to the reader in step S305. As will be discussed below, the transmission module 150 also delivers the relevant profile information for delivery to the reader (i.e., the profile information upon which the content was selected for delivery to the reader) in step S305. The reader then receives the selected content and relevant profile information in step S307.

Figure 4A:
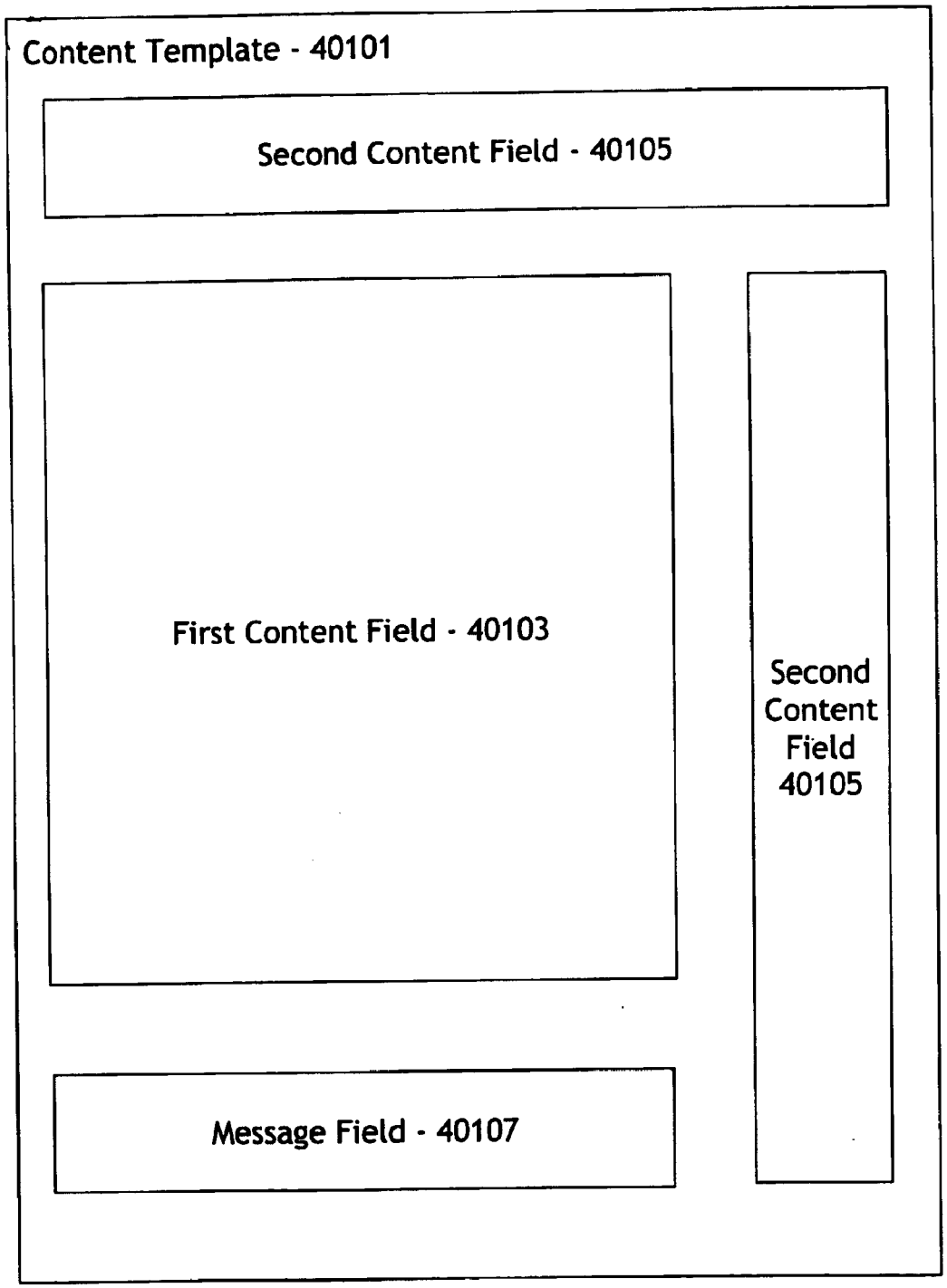
FIGS. 4A and 4B illustrate content templates according to embodiments of the invention.

According to some embodiments of the invention, the transmission module 150 employs content templates to deliver informational content and advertisements to the reader. These templates allow information to easily be presented in an aesthetically please format. A content template 40101 according to one embodiment of the invention is illustrated in FIG. 4A. As seen in this figure, the template 40101 includes a first content field 40103 for containing first content (i.e., the informational content provided by the informational content providers 50). The template 40101 also has one or more second content fields 40105 for containing second content (i.e., the advertisements provided by the advertising providers 80). Still further, the template 40101 has at least one message field 40107. This message field 40107 is used to contain messages from the content delivery system 10 to the reader. For example, the message field 40107 may be used to deliver messages such as the reader's name, the date, pagination information, and the reader's delivery location. Thus, a typical message in the message field 40107 may read:

"This is page 1 of 10 delivered to user CASTLE on Mar. 13, 2000, in Corvallis, Oreg."

With the template shown in FIG. 4A, the transmission module 150 may include the pertinent profile information with the messages in the message field 40107. Thus, with the example described above, the message field 40107 may instead read:

"This is page 1 of 10 delivered to user CASTLE on Mar. 13, 2000, in Corvallis, Oreg. The materials on this page match user profile keywords: New York Times, Oregon, Income Level [D], Sewing, Astronomy, Age Interest Level [G, J], and HP DeskJet 970Cxi."

Figure 4B:
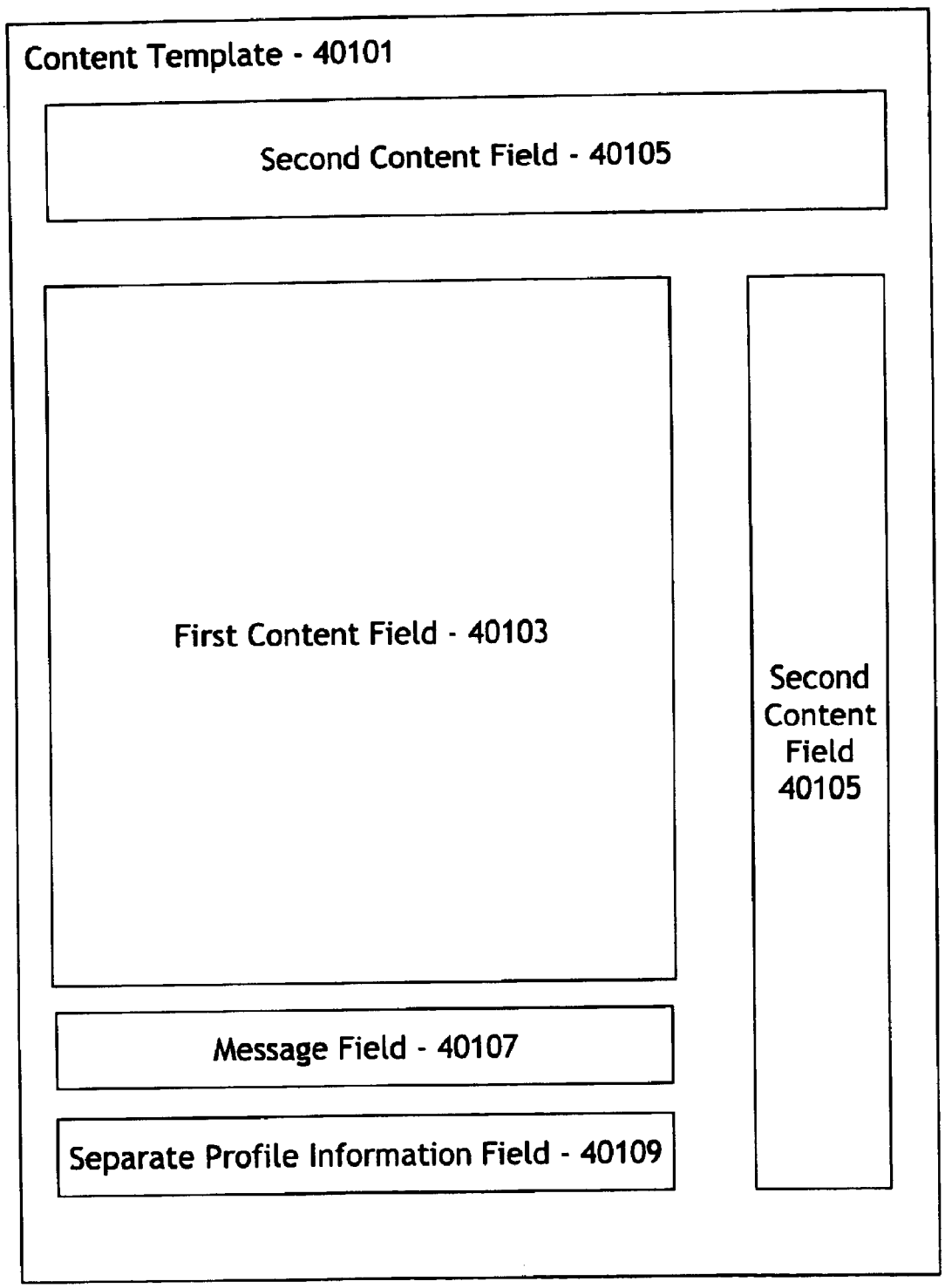

According to another embodiment of the invention, the template 40101 may include a separate profile information field 40109, as shown in FIG. 4B. With this arrangement, for the example given above, the message field 40107 might read:

"This is page 1 of 10 delivered to user CASTLE on Mar. 13, 2000, in Corvallis, Oreg."

while the profile information field 40109 might read:

"The materials on this page match user profile keywords: New York Times, Oregon, Income Level [D], Sewing, Astronomy, Age Interest Level [G, J], and HP DeskJet 970Cxi."

As will be understood from the above description, the transmission module 150 not only selectively provides informational content and advertising to a reader, but also allows the reader to see precisely what profile information was used to direct the informational content and advertising to the reader. That is, the reader is provided with the pertinent profile information so that the reader knows why he or she is receiving particular informational content and advertising. This demystifies the informational content and advertising selection process for the reader, allowing the reader to ascertain whether his or her privacy has been violated.

With still other embodiments of the invention, the transmission module 150 may also provide the reader with an interface that allows the reader to modify his or her reader profile information. For example, the transmission module may include a universal resource locator (URL) address with the profile information. The URL can then refer to a Web page (e.g., a page with hypertext markup language (HTML) entries that is provided over the network 400) that allows the reader both to view his or her profile information and to modify that profile information. The profile information provided through the interface may be just the pertinent profile information used to select the particular informational content and advertising being concurrently transmitted to the reader, or it may display all of the reader's reader profile information 20301, as shown in FIG. 5.

The interface may be included with the messages and the pertinent profile information in the message field 40107 of the template 40101 in FIG. 4A. Thus, with the example given above, the message field 40107 may read:

"This is page 1 of 10 delivered to user CASTLE on Mar. 13, 2000, in Corvallis, Oreg. The materials on this page match user profile keywords: New York Times, Oregon, Income Level [D], Sewing, Astronomy, Age Interest Level [G, J], and HP DeskJet 970Cxi. To get more information about these keywords or to modify your user profile, go to http://www.instant-delivery.com/users."

Of course, those of ordinary skill in the art will appreciate that the interface can be included with the pertinent profile information in the profile information field 40109 of the template 40101 of FIG. 4B. In this instance, the profile information field 40109 might read:

"The materials on this page match user profile keywords: New York Times, Oregon, Income Level [D], Sewing, Astronomy, Age Interest Level [G, J], and HP DeskJet 970Cxi. To get more information about these keywords or to modify your user profile, go to http://www.instant-delivery.com/users."

Still further, it will be appreciated that the interface may even be provided within a template in a separate interface field.

By providing the interface along with the pertinent profile information, the content delivery system 10 of the invention not only assuages concerns readers may have regarding their privacy, but also empowers readers to correct inaccurate or incorrect profile information. Thus, a reader that has received unwanted informational content or advertising from the delivery system 10 can ascertain why he or she has received the unwanted informational content or advertising, and modify his or her profile information to help prevent similar unwanted informational content or advertising from being delivered to the reader again.

It should be noted that, while the above-described embodiments all refer to reader profile information 20301 for examples, various embodiments of the invention may allow readers to at least view any content profile information 20101 and/or advertisement profile information 20201 that has led a reader to receive particular content or advertising. Moreover, while the interface described above is a URL address for a Web page, those of ordinary skill in the art will appreciate that an infinite variety of different interfaces can be used according to the invention to allow a reader to view and/or modify his or her reader profile information 20301.

The present invention has been described above by way of specific exemplary embodiments, and the many features and advantages of the present invention are apparent from the written description. Thus, it is intended that the appended claims cover all such features and advantages of the invention. Further, since numerous modifications and changes will readily occur to those skilled in the art, the specification is not intended to limit the invention to the exact construction and operation as illustrated and described. For example, the invention may include any one or more elements from the apparatus and methods described herein in any combination or subcombination. Accordingly, there are any number of alternative combinations for defining the invention, which incorporate one or more elements from the specification (including the drawings, claims, and summary of the invention) in any combinations or subcombinations. Hence, all suitable modifications and equivalents may be considered as falling within the scope of the appended claims.

What is claimed is:

1. A document delivery system for delivery of documents to a reader via a network, comprising:
    a knowledge module containing profile information, including at least reader profile information;
    an edit module containing first content and second content; and
    a transmission module for
        transmitting the first content and the second content to a reader for display based upon the profile information, and
        transmitting at least a portion of the reader profile information for display to the reader, wherein
        the reader profile information includes one or more type of denied data that is transmitted to the reader for display during transmission of at least a portion of the reader profile information to allow the reader to modify incorrect denied data profile information.

2. The document delivery system recited in claim 1, wherein the profile information includes advertisement profile information corresponding to the second content.

3. The document delivery system recited in claim 2, wherein the advertisement profile information includes one or more types of information selected from the group consisting of: global advertiser profile information and specific advertisement profile information.

4. The document delivery system recited in claim 1, wherein the reader profile information includes one or more types of information selected from the group consisting of: behavior profile information and voluntary profile information.

5. The document delivery system recited in claim 1, wherein the transmission module further transmits an interface usable by the reader to modify the reader profile information.

6. The document delivery system recited in claim 5, wherein the interface is a universal resource locator for a page usable by the reader to modify the reader profile information.

7. A method of delivering informational content to a reader, comprising:
    receiving profile information, including at least reader profile information identifying content preferences for the reader;
    receiving first content;
    receiving second content; and
    transmitting to a reader
        the first content and the second content based on the profile information, and
        at least a portion of the reader profile information, wherein the reader profile information includes one or more type of denied data that is transmitted to the reader for display during transmission of at least a portion of the reader profile information to allow the reader to modify incorrect denied data profile information.

8. The method of delivering content to a reader recited in claim 7, wherein the profile information includes advertisement profile information corresponding to the second type of content.

9. The method of delivering content to a reader recited in claim 8, wherein the advertisement profile information includes one or more types of information selected from the group consisting of: global advertiser profile information and specific advertisement profile information.

10. The method of delivering content to a reader recited in claim 7, wherein the reader profile information includes one or more types of information selected from the group consisting of: behavior profile information and voluntary profile information.

11. The method of delivering content to a reader recited in claim 7, further including displaying an interface usable by the reader to modify the reader profile information.

12. The method of delivering content to a reader recited in claim 11, wherein the interface is a universal resource locator for a page usable by the reader to modify the reader profile information.

13. A method of receiving content to read, comprising:
    receiving profile information, including at least reader profile information identifying content preferences for the reader;
    receiving a display of first content;
    receiving a display of second content; and
    receiving a display of profile information, including at least reader profile information, related to the first or second content, wherein the reader profile information includes one or more type of denied data that is transmitted to the reader for display during receiving of the reader profile information to allow the reader to modify incorrect denied data profile information.

14. The method of receiving content recited in claim 13, wherein the profile information includes advertisement profile information corresponding to the second type of content.

15. The method of receiving content recited in claim 14, wherein the advertisement profile information includes one or more types of information selected from the group consisting of: global advertiser profile information and specific advertisement profile information.

16. The method of receiving content recited in claim 13, wherein the reader profile information includes one or more types of information selected from the group consisting of: behavior profile information and voluntary profile information.

17. The method of receiving content recited in claim 13, further including receiving an interface usable by the reader to modify the reader profile information.

18. The method of receiving content recited in claim 17, wherein the interface is a universal resource locator for a page usable by the reader to modify the reader profile information.

19. An apparatus for delivering documents to a reader via a network, comprising:
   knowledge storage means for storing profile information, including at least reader profile information;
   edit means for storing at least one of first content and second content; and
   transmission means for
      transmitting the first content and the second content to a reader for display based upon the profile information, and
      transmitting at least a portion of the reader profile information for display to the reader, wherein
      the reader profile information includes one or more type of denied data that is transmitted to the reader for display during transmission of at least a portion of the reader profile information to allow the reader to modify incorrect denied data profile information.

20. The apparatus recited in claim 19, wherein the profile information includes advertisement profile information corresponding to the second content.

21. The apparatus recited in claim 20, wherein the advertisement profile information includes one or more types of information selected from the group consisting of: global advertiser profile information and specific advertisement profile information.

22. The apparatus recited in claim 19, wherein the reader profile information includes one or more types of information selected from the group consisting of: behavior profile information and voluntary profile information.

23. The apparatus recited in claim 19, wherein the transmission means also transmits an interface usable by the reader to modify the reader profile information.

24. The apparatus recited in claim 23, wherein the interface is a universal resource locator for a page usable by the reader to modify the reader profile information.

25. The apparatus of claim 23, wherein said edit means comprises a computer.

26. The apparatus of claim 23, wherein said knowledge storage means comprises of a computer.

27. The apparatus of claim 23, wherein said transmission means comprises a computer.

28. The apparatus of claim 23, wherein said transmission means comprises a data network.

\* \* \* \* \*